United States Patent [19]
Barnard et al.

[11] Patent Number: 4,930,369
[45] Date of Patent: Jun. 5, 1990

[54] RADIAL GROUND DRIVE AND BLADE CLUTCH CONTROL FOR LAWNMOWER

[75] Inventors: Michael A. Barnard; Anthony F. Beugelsdyk, both of Wichita, Kans.

[73] Assignee: Wescon Products Company, Wichita, Kans.

[21] Appl. No.: 309,256

[22] Filed: Feb. 13, 1989

Related U.S. Application Data

[62] Division of Ser. No. 71,470, Jul. 9, 1987, Pat. No. 4,850,182.

[51] Int. Cl.$^5$ .................... G05G 9/08; A01D 69/00
[52] U.S. Cl. ................... 74/480 R; 56/10.8; 74/529; 180/19.3; 192/48.7
[58] Field of Search ............... 56/10.8, 11.3; 74/480 R, 529; 180/19.1, 19.2, 19.3; 192/48.7, 129 R

[56] References Cited

U.S. PATENT DOCUMENTS

| | | | |
|---|---|---|---|
| 4,230,200 | 10/1980 | Carolan | 180/272 |
| 4,309,862 | 1/1982 | Carlson | 56/10.5 |
| 4,361,201 | 11/1982 | Hallstedt et al. | 180/19.3 |
| 4,363,206 | 12/1982 | Schmitt | 56/11.3 |
| 4,428,180 | 1/1984 | Carlson | 56/11.3 |
| 4,432,191 | 2/1984 | Schmitt | 56/11.3 |
| 4,455,811 | 6/1984 | Beugelsdyk | 56/10.8 |
| 4,466,232 | 8/1984 | Beugelsdyk et al. | 56/11.3 |
| 4,476,643 | 10/1984 | Hilchey et al. | 180/19.3 X |
| 4,503,958 | 3/1985 | Nishio | 56/11.3 |
| 4,573,307 | 3/1986 | Wick | 56/11.3 |
| 4,599,912 | 7/1986 | Barnard et al. | 56/11.3 |
| 4,667,459 | 5/1987 | Scanland et al. | 56/11.3 |

*Primary Examiner*—Allan D. Herrmann
*Attorney, Agent, or Firm*—Hovey, Williams, Timmons & Collins

[57] ABSTRACT

A compact, versatile lawnmower control is provided which is especially useful for holding and releasing ground drive and blade clutch cables and which allow connection and removal of the cable end without dismantling the control, allows the optional inclusion of a releasable handle lock, and allow the use of a deadman handle to release two cables at differing release distances. The preferred control includes an operating handle having a tubular body rotatably mounted within a housing; a coupling element rotatably mounted coaxially with the handle body for coupling with a deadman handle; and a holding and releasing means intercoupling the element and the body for holding the handle in a second position when the element is in the operating position and for releasing the handle for shifting to a first position when the element shifts to a relaxed position. Additionally, the preferred control includes means whereby the cable can be connected to and removed from the handle without dismantling the control and means preventing handle movement when released by a manually operated release lever.

3 Claims, 3 Drawing Sheets

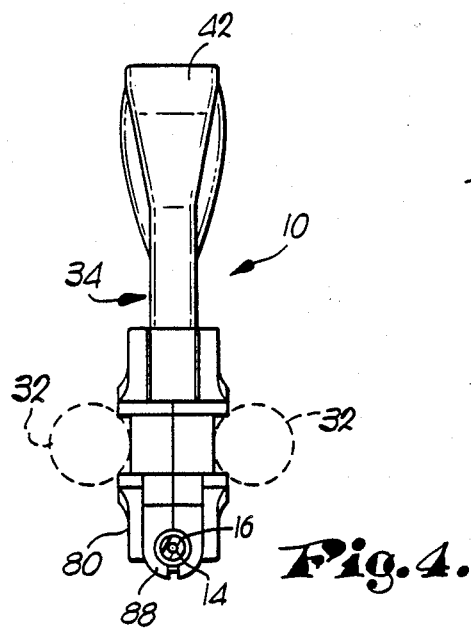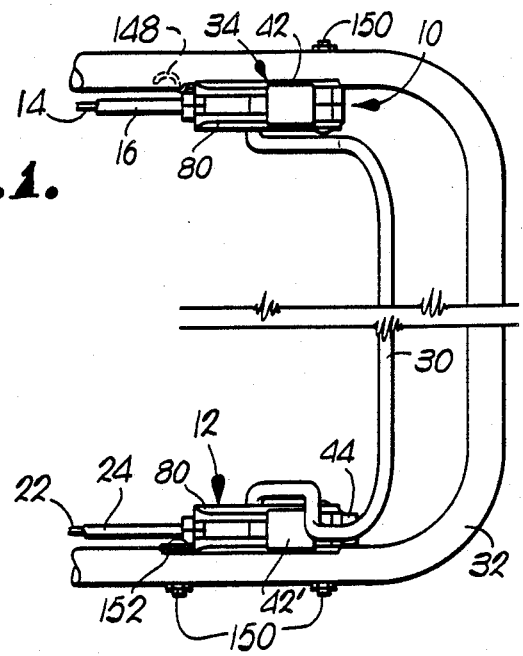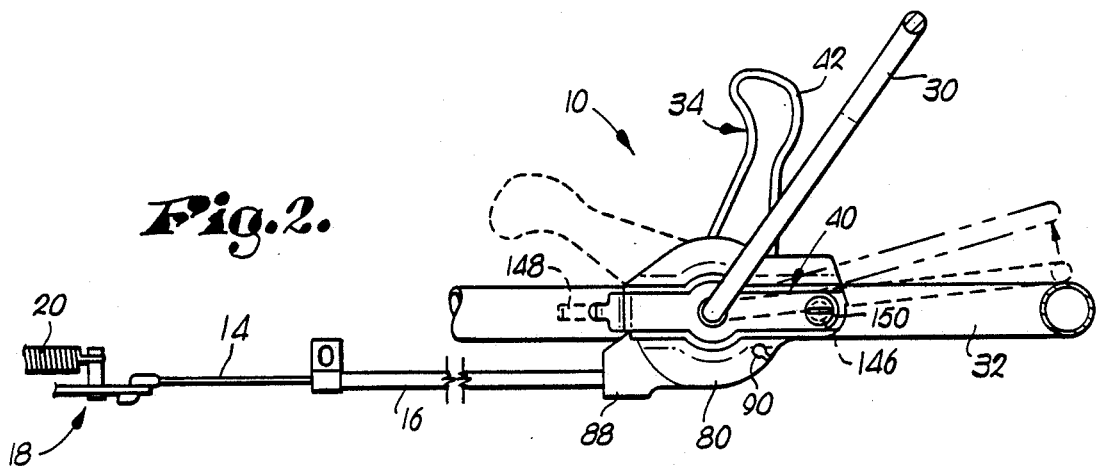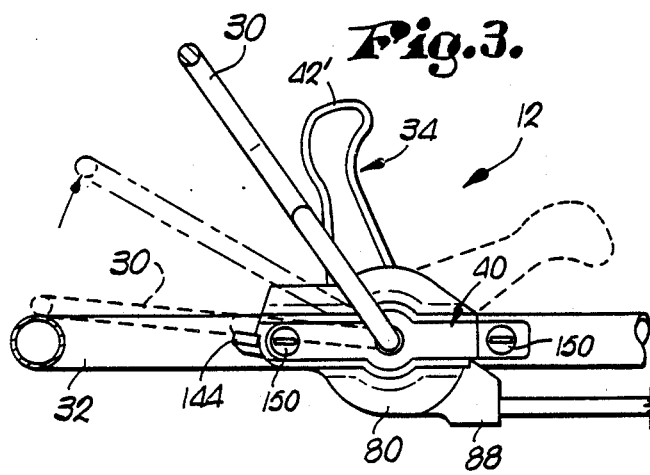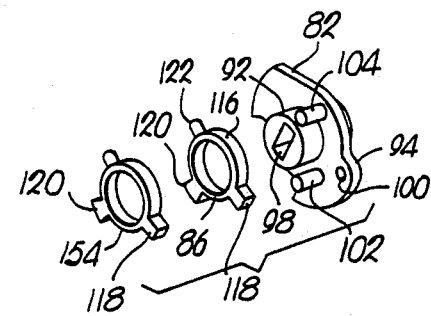

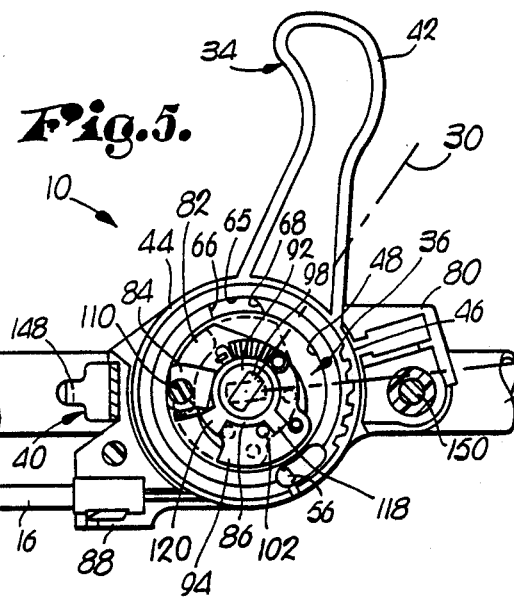

RADIAL GROUND DRIVE AND BLADE CLUTCH CONTROL FOR LAWNMOWER

This is a division of application Serial No. 07/071,470, filed on July 9, 1987, now U.S. Pat. No. 4,850,182.

BACKGROUND OF THE INVENTION

1. Field of the Invention

The present invention is concerned with an improved cable control device for use on walk-behind lawnmowers of the type having a cable actuated blade clutch and cable actuated ground drive for propelling the wheels of the lawnmower. More particularly, the present invention is concerned with a compact and versatile cable control device for shifting a lawnmower control cable between engaged and disengaged positions, and for coupling with a deadman handle whereby the device releases for shifting of the cable to the disengaged position whenever the deadman handle is moved away from its operating position. Additionally, the present invention is concerned with a means for connecting and removing the cable from the control device handle without dismantling the device, for providing a manually releasable handle lock, and for providing a system for controlling two cables which are released at two different deadman handle positions.

2. Description of the Prior Art

So-called walk-behind rotary powered mowers are well known and in widespread use. Generally speaking, such mowers include a lowermost housing supported on spaced wheels with a gasoline powered engine coupled to a rotary mower blade disposed within the housing, and also optionally coupled to the lawnmower wheels for powered propulsion thereof. An elongated U-shaped handle is typically affixed to the housing at the rear thereof so that the user simply guides the mower in a "walk-behind" fashion.

Safety concerns and government regulations have prompted the need for improved safety in the operation of power mowers. For example, mowers are commonly equipped with a so-called "deadman" handle which generally includes a spring-biased bail or other handle which is grasped by the operator during normal operation of the mower. If the bail is released, mowing action is rapidly terminated for reasons of safety. Such termination may be by way of stopping the motor or through a clutch mechanism operatively coupled to the bail which disengages the blade from the mower motor and commonly brakes the blade to a stop when the bail is released.

Additionally, if a particular mower includes a ground drive, that is, self-propelled wheels, it is also necessary to disengage the ground drive in the event the deadman handle is released. Stopping of the wheels may be accomplished by disengaging a ground drive clutch operated by means of a control cable.

In response to the safety needs as discussed above, a number of cable control devices are available whereby release of a deadman handle causes a cable to disengage thereby disengaging a blade clutch control, ground drive, or the like. A typical cable control device must be capable of coupling with one end of the lawnmower control cable and of coupling with the deadman handle. Known prior art devices such as that disclosed in Carlson Patent No. 4,428,180, however, tend to be bulky in order to accommodate all the required mechanical functions.

It is sometimes desired to provide a blade clutch control which requires two distinct operating steps in order to engage the blade clutch to ensure such does not occur inadvertently. The length of clutch cable travel, however, varies between mower brands and models. Thus, a two-step control must be provided which is specifically designed for cable travel of the particular make or model. This requires the provision of various models of blade clutch control devices in order to accommodate the variations in clutch cable travel distances.

Additionally, known prior art cable devices are designed such that the cable must be incorporated within the device during manufacture and assembly thereof. As a result, purchasers of the cable control devices must specify the cable length when ordering the device. If the cable breaks during use or during lawnmower assembly, it is necessary to order a whole new device for the sake of replacing a broken cable or to disassemble the device in order to replace only the cable with the attendant risk of the parts being lost or broken before reassembly.

Finally, known prior art lawnmower control systems for use with two control cables, such as with a blade clutch cable and a ground drive cable, are designed so that release of the deadman handle causes release and disengagement of both cables. Known prior art systems do not allow partial movement of the deadman handle in order to release the ground drive, for example, while leaving the blade clutch control engaged.

SUMMARY OF THE INVENTION

The problems outlined above are solved by the cable control device and system of the present invention. That is to say, the present invention provides for a compact cable control device which allows cable replacement without disassembly of the device, provides an optionally included handle lock which can accommodate individually varying cable travel lengths, and provides for control of two cables whereby the cables are released to their disengaged positions at different distances of deadman handle travel.

The preferred device in accordance with the present invention includes a shiftable operating handle including means for connecting with a lawn-mower control cable and for selectively shifting the cable between first and second positions in response to shifting of the operating handle between corresponding first and second positions, the cable being biased toward the first position and thereby biasing the operating handle toward the first position, the operating handle including a rotatable body; and an operating mechanism including a housing means rotatably mounting the body, a rotatable coupling element for coupling with the lawnmower deadman handle and rotatable between and operating and relaxed positions in response to corresponding shifting of the deadman handle when coupled thereto, means rotatably mounting the element in coaxial alignment with the body, and holding and releasing means intercoupling the element and the body for holding the operating handle in the second position when the element is in the operating position and for releasing the operating handle for shifting to the first position when the element is in the relaxed position.

More particularly, the holding and releasing means includes a shiftable pawl for engagement with a blocking surface defined on the interior wall of the body when the operating handle is in the second position in order to hold the operating handle in the second position, and shiftable retaining means coupled with the element for retaining the pawl in engagement with the blocking surface when in a retaining position and when the element is in the operating position, and for releasing the pawl from engagement when the element is in the relaxed position.

Additionally, the preferred device includes an operating handle shiftable along an operating path and including structure defining a recess for normally receiving the end of a lawnmower control cable, a cable outlet, and a cable end removal opening, the outlet and opening both being in communication with the recess, the cable outlet presenting a cable passageway for passage of the cable from the cable end away from the handle in a first direction for connection to a remote, control point, the removal opening being oriented for removal of the cable end from the recess by moving the cable end in a second direction different from the first direction; and a support housing having walls for shiftably supporting the handle and having structure defining a cable end removal aperture in one of the walls, the aperture being oriented for registration with the opening when the handle reaches a predetermined point along the operating point thereof, the cable end being removable from the handle and the housing when the handle is shifted to the predetermined registration point.

Also, the preferred control device includes a shiftable handle including means for connecting the handle with the end of a lawnmower cable for selectively shifting the cable between engaged and disengaged positions in response to shifting of the handle between a primary position corresponding to the engaged position of the cable and one of a plurality of secondary positions, the one secondary position corresponding to the disengaged position of the cable; means for releasably preventing shifting of the handle toward the primary position from any of the secondary positions; and means for releasing the handle in order to allow the handle to shift toward the primary position from any of the secondary positions.

Finally, the preferred control system broadly includes a first cable control device having a first shiftable operating handle including means for connecting with a first control cable end for selectively shifting the first cable between the first and second positions in response to the shifting of the operating handle between the corresponding first and second positions, the first cable, when connected with the first operating handle, correspondingly biasing the first handle toward the first position; a second cable control device having a second shiftable operating handle including means for connecting with a second lawnmower cable end for selectively shifting the second cable between the first and second positions in response to shifting of the second operating handle between corresponding first and second positions, the second cable, when connected with the first operating handle, correspondingly biasing the second operating handle toward the first position; a deadman handle having an operating position and being shiftable toward and away from the operating position; means operatively coupling the control devices with the deadman handle, the first device including means for holding the first handle in the second position when the deadman handle is in the operating position and for releasing the first handle in order to allow the first handle to shift from the second position to the first position when the deadman handle shifts a first predetermined distance away from the operating position, the second control device including means for holding the first handle in the second position when the deadman handle is in the operating position and for releasing the second handle in order to allow the second handle to shift from the second position to the first position when the deadman handle shifts a second predetermined distance, different from the first predetermined distance, away from the operating position.

BRIEF DESCRIPTION OF THE DRAWING

FIG. 1 is a partial top plan view of a lawnmower control showing a pair of control devices coupled to a lawnmower handle, a pair of control cables, and a deadman handle;

FIG. 2 is a fragmentary side elevational view of the lawnmower control of FIG. 1 showing, in phantom lines, alternative positions of the operating handle of one device and deadman handle;

FIG. 3 is a fragmentary side elevational view of the opposite side of the control of FIG. 1 showing the other control device with alternative positions of the operating handle and deadman handle in phantom lines;

FIG. 4 is a front elevational view of the control showing alternate locations of a lawnmower handle in phantom lines;

FIG. 5 is a fragmentary side elevational view of the control, with the control device in partial section, and with positions of the device shown in phantom lines;

FIG. 6 is a view similar to FIG. 5 but showing the control in a shifted position as compared to FIG. 5;

FIG. 7 is a view similar to FIG. 6 but showing the control in a shifted position as compared to FIG. 6;

FIG. 8 is a view similar to FIG. 7 but showing the control in a shifted position as compared to FIG. 7;

FIG. 9 is a fragmentary side elevational view of the lawnmower control showing a second control device in partial section with alternative positions of the control shown in phantom;

FIG. 10 is a sectional view taken along line 10—10 of FIG. 9;

FIG. 11 is a fragmentary partially sectional view of the control device. FIG. 12 is a sectional view along line 12—12 of FIG. 11;

FIG. 13 is an exploded view of alternate pawl retainers and a coupling element.

DESCRIPTION OF THE PREFERRED EMBODIMENT

Figure 14:
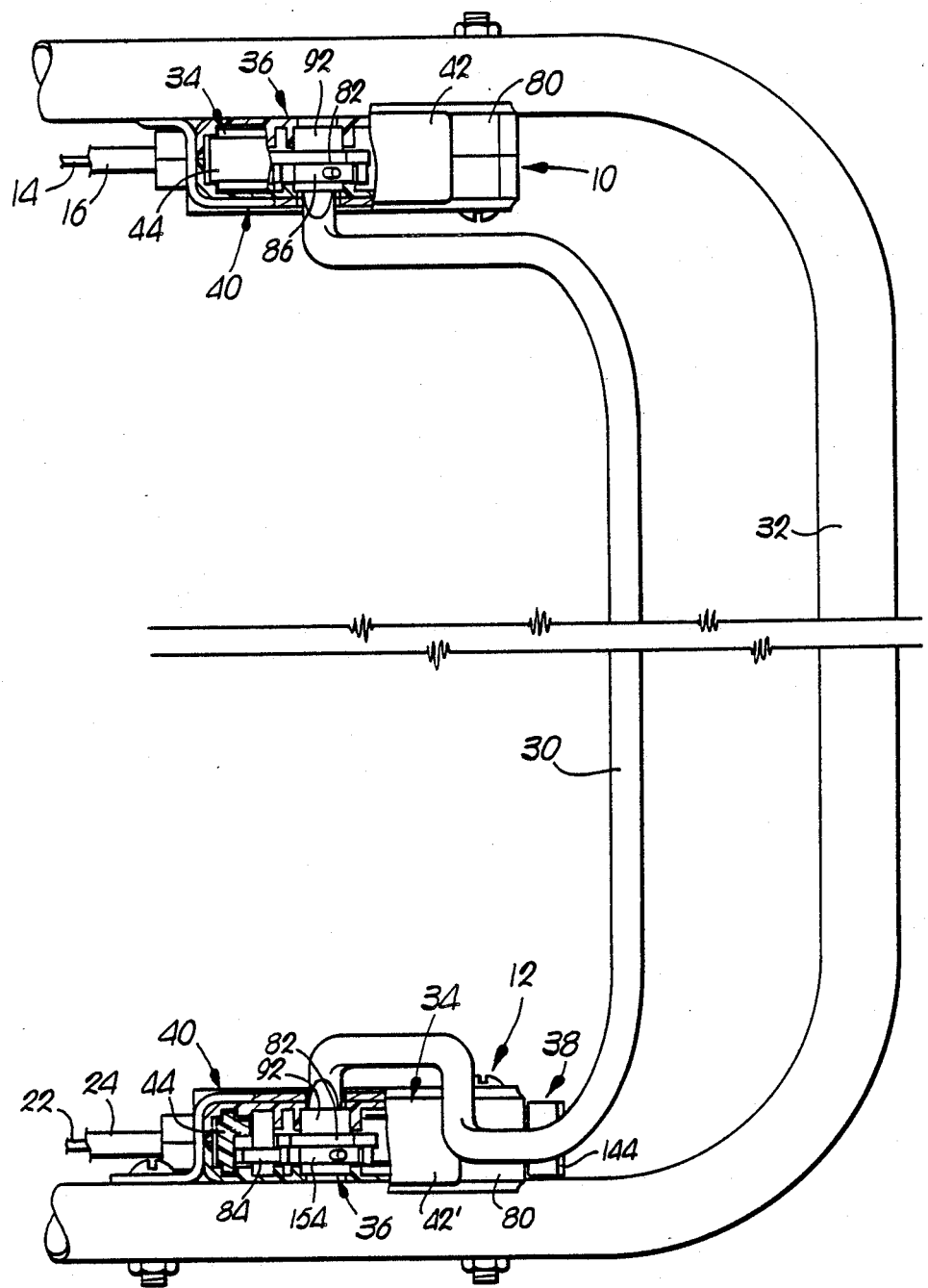
FIG. 14 is a partial top plan view of a lawnmower control showing a pair of control devices in partial section with portions cut away for clarity illustrating the use of different pawl retainers.

Turning now to the drawings, FIG. 1 illustrates the preferred use of a pair of control devices 10 and 12 in accordance with the present invention in the preferred environment of use with a lawnmower.

As shown in FIGS. 1 and 2, control device 10 is coupled with ground drive cable 14 enclosed in sheath 16. One end of cable 14 is coupled to the blade clutch control mechanism 18. Spring 20 biases cable 14 toward the disengaged position (leftwardly as shown in FIG. 2).

FIGS. 1 and 3 illustrate control device 12 coupled with blade clutch cable 22 enclosed in sheath 24. One end of cable 22 is coupled by way of blade clutch biasing spring 26 to blade clutch control mechanism 28. Spring 26 biases cable 22 toward the disengaged position (rightwardly as shown in FIG. 3).

Deadman handle or bail 30 intercouples devices 10 and 12 as shown in FIG. 1. In the preferred environment of use, devices 10 and 12 are respectively coupled to opposed legs of U-shaped lawnmower handle 32. Deadman handle 30 is preferably configured as a rotatable bail as best shown in FIG. 1. Those skilled in the art will appreciate, however, that deadman handle 30 could be configured as a depressable lever extendable from handle 32 in addition to other possible configurations.

Turning now to the details of the preferred control device in accordance with the present invention, control device 10 broadly includes handle 34, operating mechanism 36, handle locking mechanism 38 (FIGS. 11, 12), and device fastening means 40 (FIGS. 2, 3).

Operating handle 34 is configured to present an extended graspable portion 42 (graspable portion 42' for device 12) and a tubularly-shaped body 44. Body 44 presents exterior circumferential wall 46, interior wall 48, left side wall 50 (FIGS. 5-10), and right side wall 52 (FIG. 10)

Body 44 also includes means for coupling with cable end 54 which conventionally presents a T-shaped configuration including a retaining pin 56 extending orthogonally from both sides of cable 14. Means for coupling cable end 54 to said body 44 includes cable end recess 58, cable outlet 60, cable end removal opening 62, and cable groove or passageway 64.

Recess 58 is defined in left side wall 50 to present a generally eliptical cross-section as shown in FIGS. 5-9. Cable passageway or groove 64 extends along exterior wall 46 about an arc of approximately 120°. One end of cable passageway 64 communicates with recess 58 by way of cable outlet 60. Removal opening 62 extends outwardly through left side wall 50.

Cable retaining pin 56 is received in recess 58 with cable 14 extending through cable outlet 60 and along passageway 64. Cable 14 is received variably along the arc of passageway 64 depending upon the position of operating handle 34 as shown in FIG. 5-8.

Interior wall 48 includes recess 65 defined therein which further defines blocking wall 66 disposed orthogonal to interior wall 48 and opposed outwardly sloping wall 68. The purpose of walls 66, 68 will become clear from the discussion hereinafter.

Exterior wall 46 also includes five locking recesses 70 defined therein spaced about an arc of about 45°. Opposed ends of recesses 70 are defined by a locking wall 72 generally orthogonal to exterior wall 46 at that point, and an outwardly opening acute angled wall 74. The purpose of walls 72 and 74 will become clear from the discussion hereinafter.

Left side wall 50 presents an outwardly extending circular bearing wall 76. Similarly, right side wall 52 also presents an outwardly extending circular right bearing wall 78. The purposes of bearing walls 76, 78 will become clear from the discussion hereinafter.

Operating mechanism 36 includes irregularly shaped housing 80 configured in two separable halves, rotatable bail coupling element 82, blocking pawl 84, and retainer 86.

Housing 80 rotatably receives tubular body 44 therein by providing bearing troughs (not shown) which are configured to correspondingly and rotatably receive left and right bearing walls 76, 78. Additionally, housing 80 integrally includes cable sheath clip 88 for retaining the expanded end of sheath 16. Sheath clip 88 generally tangentially presents cable 14 for reception in cable passageway 64. Additionally, the upper and lower portions of housing 80 are discontinuous in order to present graspable portion 42 of handle 34 and to present cable passageway 64 for access to cable 14 when replacement is necessary.

Housing 80 also includes removal aperture 90 (FIG. 2) whereby cable end 54 can be removed therethrough when removal opening 62 and aperture 90 are aligned in registration. Removal opening 62 and removal aperture 90 are aligned when handle 34 is in the position as shown in FIG. 2. This position is between the forwardmost or engaged position of handle 34 and the rearwardmost or disengaged position of handle 34. In this way, opening 62 and aperture 90 are not aligned during normal at-rest positions of handle 34.

In order to remove cable 14, opening 62 and aperture 90 are aligned as shown in FIG. 2, cable 14 is manually grasped and pulled outwardly away from passageway 64 until cable 14 extends outwardly at about 90° to exterior wall 46. With this alignment, cable 14 including cable end 54 and retaining pin 56 are moved leftwardly whereby pin 56 and that portion of cable 14 adjacent thereto move through removal opening 62 and removal aperture 90. Sheath 16 is then removed from sheath clip 88 and cable 14 is thus disconnected from device 10. Another cable can then be placed by reversing the above described steps. Thus, disassembly of mechanism 36 is not required in order to replace cable 14.

Bail coupling element 82 is rotatably received in housing 80 so that it is coaxially aligned with and received within tubular body 44 of handle 34. Coupling element 82 includes tubular bail coupling member 92, auxiliary member 94, and torsion spring 96.

Member 92 includes a rectangular in cross-section opening 98 configured to receive the correspondingly shaped coupling end of deadman bail 30 therein. Housing 80 includes a pair of opposed openings defined therein for respective access to opening 98 from either side of housing 80.

Auxiliary member 94 is preferably integrally coupled with member 92, extends outwardly therefrom, and includes spring coupling port 100, outwardly projecting retainer stop 102, outwardly projecting retainer spring coupling pin 104, and presents a pair of opposed spaced-apart stop surfaces 106 and 108 which limit the rotation of travel of coupling element 82 as will be further explained hereinafter.

Torsion spring 96 is received about coupling member 92 with one end thereof received in spring coupling port 100 and the other end abutting a conventional projection in housing 80 (not shown). Torsion spring 96 biases coupling element 82 and thereby deadman bail 30 to the relaxed position (counter-clockwise as shown in FIGS. 2, and 5-9).

Blocking pawl 84 is rotatably coupled within housing 80 by appropriately configured bearing surfaces (not shown) by way of pawl rotation pin 110. Pawl 84 presents blocking surface 112 and retaining surface 114 which are configured at about 90° to one another about rotation pin 110 as shown in FIG. 5-9.

Retainer 86 includes tubular collar 116 rotatably received about bail coupling member 92, stop dog 118 extending outwardly from collar 116, retaining cam 120 also extending outwardly from collar 116 and spaced-apart from dog 118, spring coupling projection 122 also extending outwardly from collar 116, and retainer spring 124. Spring 124 is coupled between projection 122 and coupling pin 104 and biases retainer 86 clockwise about and relative to bail coupling element 82 so that stop dog 118 is biased toward retainer stop 102. Retaining cam 120 presents an outboard retaining surface 126 and adjacent movement surface 128.

Referring now to FIGS. 11 and 12, handle locking mechanism 38 includes slidable locking pawl 130 slidably received in housing 80, biasing lock spring 132, and rotatable unlocking lever 134 rotatably received in housing 80.

Locking pawl 130 includes a pair of locking tips 136 and 138 spaced-apart at the inboard end thereof (FIG. 12) which are configured to be matingly received in locking recesses 70. Pawl 130 also includes unlocking projection 140.

Locking spring 132 is received between the outboard end of pawl 130 and housing 80 so that pawl 130 is biased inwardly.

Unlocking lever 134 includes release cam 142 and manual release knob 144 which extends exteriorally from housing 80 from the rearward side thereof.

Fastening means 40 is shown in two alternatives. The first alternative is associated with control device 10 and is basically in the form of an L-shaped strap having a fastener receiving hole 146 defined adjacent the end of one leg thereof and fastening clip 148 coupled adjacent the end of the other leg thereof. Fastener clip 148 is configured as shown by the dashed lines of FIG. 1 to be received in a fastener hole defined in lawnmower handle 32 and fastener receiving hole 146 is configured to receive a conventional bolt therethrough which extends through housing 10 and handle 32. This first configuration of fastening means 40 is advantageous in that only one conventional fastening bolt 150 is required.

The other alternative fastening means 40 is similar to the first embodiment except that clip 148 is replaced by fastening flange 152 having a fastener receiving hole defined therein. In this way, the second embodiment of fastening means 40 is configured to receive two fastening bolts 150 as a matter of designer choice. The second embodiment of fastener means 40 is associated with control device 12 as shown in FIG. 1.

The use of control device 10 is illustrated in FIGS. 2 and 5–8. Device 10 is used in connection with the ground drive control of the lawnmower and typically a handle locking mechanism 38 is not included in this usage.

FIG. 2 illustrates device 10 in the disengaged position whereby cable 14 is extended leftwardly in the disengaged position. Similarly, bail 30 is shown in the relaxed position being biased thereto by the action of torsion spring 96 acting on bail coupling element 82. In this position, bail coupling element 82 is in its most counter-clockwise position with stop surface 106 resting against and being stopped by pawl rotation pin 110.

To engage the lawnmower ground drive, the operator first places bail 30 in the operating position by pulling it downwardly against lawnmower handle 32 which limits the downward movement of bail 30. This action places bail coupling element 82 in the operating position also. Stop surface 108 limits the travel of element 82 and bail 30 by abutting against pawl rotation pin 110 when a bail is not present and element 82 is otherwise rotated.

As bail coupling element 82 rotates clockwise, blocking pawl 84 prevents similar movement of retainer 86 by abutting against movement surface 128 of retaining cam 120. The clockwise movement of bail coupling element 82, however, places tension on retainer spring 124 by virtue of the clockwise movement of spring coupling pin 104 associated with bail coupling element 82. Thus, retainer 86 is biased clockwise but prevented from clockwise movement by blocking pawl 84. The phantom lines of FIG. 5 illustrate bail coupling element 82 in the operating position.

Next, the operator moves graspable portion 42 of handle 34 forwardly so that body 44 rotates counter-clockwise. When handle 34 reaches the extreme end of its travel as illustrated in FIG. 6, cable 14 moves rightwardly against the bias of spring 20 to the engaged position of the lawnmower ground drive.

In the engaged position, the position of recess 65 allows pawl 84 to rotate therein. The clockwise biasing force on retainer 86 causes movement surface 128 in contact with retaining surface 114 to rotate pawl 84 so that blocking surface 112 abuts blocking wall 66. Retainer 86 continues to rotate to the position shown in FIG. 6 so that retaining surface 126 abuts pawl retaining surface 114. Thus, retaining cam 120 and pawl 84 prevent clockwise movement of handle 34 and maintains it in the engaged position against the bias of ground drive spring 20.

FIGS. 7 and 8 illustrate the action of operating mechanism 36 as bail 30 is raised to the release angle as determined by the configuration of retainer 86. As bail 30 rotates counter-clockwise according to the bias of torsion spring 96, bail coupling element 82 and retainer 86 similarly rotate counter-clockwise. At a rotation of about 30° in the configuration of FIGS. 5–8, retaining surface 126 moves out of contact with pawl retaining surface 114 as illustrated in FIG. 7. When this occurs, the biasing force due to spring 20, causes body 44 to rotate counter-clockwise whereby blocking wall 66 pushes against pawl blocking surface 112 causing pawl 84 to rotate clockwise as shown in FIG. 8.

The force of ground drive spring 20 is such that body 44 will continue to rotate counter-clockwise and complete the rotation of pawl 84 against the lesser bias of retainer spring 124. Once blocking wall 66 clears blocking surface 112, handle 34 "snaps" quickly to the disengaged position.

Thus, operating handle 34 holds cable 14 in the engaged position only so long as bail 30 is held against lawnmower handle 32. Once the bail release angle is reached, handle 34 is no longer retained in the engaged position by mechanism 38, and handle 34 and cable 14 quickly move to the disengaged position.

Inspection of the drawing figures, in particular FIG. 13, illustrates that the bail release angle is determined by the configuration of retainer 86. That is to say, the angular spacing between stop dog 118 and retaining cam 120 determines the release angle.

Control devices 10 and 12 are identical except that device 12 includes a differently configured retainer 154 and includes handle locking mechanism 38.

Retainer 154 is identical to retainer 86 except that retainer 154 has a greater angular spacing in between stop dog 118 and retaining cam 120. Thus, bail 30 must be displaced a greater angular distance from lawnmower handle 32 in order to disengage control device 12. With this provision, bail 30 can be raised an amount just sufficient to release ground drive device 10 and then placed back in the operating position in order to continue lawnmower operation with the blade clutch device 12 engaged. This provision is particularly useful when the lawnmower user approaches bushes or the like requiring forward and rearward movement of the lawnmower in order to mow the grass in the vicinity thereof. This eliminates the need for the operator to restart the blade clutch as is required with prior art devices wherein the blade clutch and ground drive release at the same angle.

The versatility of the control device in accordance with the present invention is enhanced by the provision of optionally included handle locking mechanism 38. As shown in FIG. 1, only control device 12 incorporates this provision which is often desired for blade clutch control in order to require two step action to engage the blade.

In the disengaged position as illustrated in FIG. 11, locking pawl tips 136, 138 engage corresponding recesses 70. Specifically, pawl tips 136, 138 abut locking wall 72 and acute-angled locking wall 74. With this configuration, handle 34 cannot be moved toward the engaged position (counter-clockwise) without first retracting locking pawl 130 against the bias of locking spring 132. The slope of wall 34, however, allows handle 34 to move from engaged to disengaged position (clockwise) without operation of unlocking lever 134.

The provision of a plurality of locking recesses 70 defines a plurality of secondary positions one of which corresponds to the disengaged position of the control cable. The provision of a plurality of secondary positions is desirable to allow for variations in the required travel of cable 22 depending upon the make and model of the lawnmower. For example, if a particular make or model of lawnmower requires only a short travel distance of cable 22 between engaged and disengaged positions, handle 34 might rotate to the first or rightmost locking recess at which point clutch biasing spring 26 is completely relaxed and no longer provides the motive force to completely rotate handle 34 to its extreme clockwise position.

Even with partial rotation, however, locking pawl 130 engages recess 70 and prevents reengagement of the blade clutch without operation of unlocking lever 134. Thus, only a single model of control device need be stocked or purchased by the lawnmower manufacturer in order to accommodate different cable travel lengths for different lawnmower models. Similarly, the provision of a plurality of locking recesses corresponding to a plurality of secondary disengaged positions allows a manufacturer of control devices to efficiently manufacture one model which can be used by different manufacturers of lawnmowers.

To release locking pawl 30, the operator depresses manual release knob 144 which causes release cam 142 to engage unlocking projection 140. This action slides locking locking pawl 130 outwardly (to the right as shown in FIG. 11) to free handle 34 for movement toward the engaged position.

Advantageously, bail 30 is configured as shown in FIG. 1 with a projection which depresses manual release knob 144 when bail 30 is in the operating position, thereby avoiding the necessity of a separate movement on the part of the operator to unlock handle 34. That is to say, with bail 30 in relaxed position, operating handle 34 is prevented from inadvertently moving toward the engaged position which might present a safety hazard, but is conveniently unlocked when bail 30 is lowered to the operating position as the projection depresses knob 144.

We claim:

1. A cable control system for a lawnmower or the like and adapted for connection to the respective ends of first and second operating cables, each of the cables being shiftable between first and second positions and being biased toward the first positions, said system comprising:
    a first cable control device having a first shiftable operating handle including means for connecting with the first cable end for selectively shifting the first cable between the first and second positions in response to shifting of said first operating handle between corresponding first and second positions, the first cable, when connected to said first operating handle, correspondingly biasing said first operating handle toward said first position;
    a second cable control device having a second shiftable operating handle including means for connecting with the second cable end and for selectively shifting the second cable between the first and second positions in response to shifting of said second operating handle between corresponding first and second positions, the second cable, when connected with said second operating handle, correspondingly biasing said second operating handle toward said first position;
    a deadman handle having an operating position and being shiftable toward and away from said operating position;
    means operatively coupling said devices with said deadman handle,
    said first device including means for holding said first handle in said second position when said deadman handle is in said operating position and for releasing said first handle in order to allow said first handle to shift from said second position to said first position when said deadman handle shifts a first predetermined distance away from said operating position,
    said second device including means for holding said second handle in said second position when said deadman handle is in said operating position and for releasing said second handle in order to allow said second handle to shift from said second position to said first position when said deadman handle shifts a second predetermined distance, different from said first predetermined distance, away from said operating position.

2. The system is set forth in claim 1, each of said holding and releasing means for said respective control devices including a rotatable retainer having outwardly extending elements presenting angular spacing therebetween defining said predetermined distance.

3. The system is set forth in claim 2, said dead-man handle being rotatably coupled with said devices and shiftable through an angular distance corresponding to said predetermined distance.

* * * * *